United States Patent Office 2,729,653
Patented Jan. 3, 1956

2,729,653
16,17-CARBOXYMETHYLENE PREGNENES AND ESTERS THEREOF

George P. Mueller, Park Ridge, Ill., assignor to G. D. Searle & Co., Chicago, Ill., a corporation of Illinois No Drawing. Application September 24, 1954, Serial No. 458,270

9 Claims. (Cl. 260—397.1)

The present invention relates to a new group of oxygenated pentacyclic compounds and, more particularly to compounds of the structural formula wherein the carbon atom in position 5 is joined to one of the carbon atoms in positions 4 and 6 by a double bond and to the other by a single bond, wherein X= is a member of the class consisting of $$O=, \quad HO-\overset{H}{\diagdown}$$

and $$(\text{lower alkyl})-COO-\overset{H}{\diagdown}$$

radicals and wherein R is a member of the class consisting of hydrogen, lower alkyl radicals and radicals of the structural formula (lower alkyl)₂-N-(lower alkylene).

In the foregoing structural formula R can represent a hydrogen atom or a lower alkyl radical such as methyl, ethyl, straight and branched chain propyl, butyl, amyl, and hexyl. R can also represent a di-(lower)-alkylamino-(lower)-alkyl radical of the type —Alk—N—(lower alkyl)₂ wherein the lower alkyl groups are of the type mentioned above and Alk is a lower alkylene radical such as ethylene, propylene, butylene, trimethylene, tetramethylene, pentamethylene and hexamethylene. The radical X=, attached to carbon-three of the steroidal moiety, can be an oxo, $$HO-\overset{H}{\diagdown}$$

or a $$(\text{lower alkyl})-COO-\overset{H}{\diagdown}-\text{radical}$$

wherein the lower alkyl group is of the type mentioned above.

The compounds of my invention are conveniently prepared by pyrolysis of the corresponding 16,17-[3',1'-(3'-carbalkoxy-2'-pyrazolino)]pregnenes according to the reaction scheme as described in my copending application Serial No. 349,984, filed April 20, 1953 of which the present application is a continuation-in-part.

The compounds of my invention are valuable because of their cardiovascular and, specifically, hypotensive action. They also have a cortisone-like lympholytic effect.

The following examples describe in further detail certain of the compounds which constitute this invention and methods for their preparation. However, the invention should not be construed as limited thereby in spirit or in scope. It will be obvious to chemists skilled in the art that numerous modifications in methods and materials can be adopted without departing from the scope of the invention. In these examples, quantities are indicated in parts by weight and temperatures in degrees centigrade.

EXAMPLE 1

*Ethyl ester of 3-acetoxy-16,17-[3',1'-(3'-carboxy-2'-pyrazolino)]-Δ⁵-pregnen-20-one*

A mixture of 71 parts of 3-acetoxy-Δ⁵,¹⁶-pregnadien-20-one and 103 parts of ethyl diazoacetate is heated on an oil bath at 115–120° C. for 75 minutes. There is an evolution of gas and the crystal cake melts slowly. On cooling a crystalline cake forms again. Successive recrystallizations from benzene and from methanol yield the ethyl ester of 3-acetoxy - 16,17 - [3',1' - (3'-carboxy-2'-pyrazolino)]-Δ⁵-pregnen-20-one, melting at about 217–222° C. with decomposition. The compound has the structural formula

EXAMPLE 2

*Ethyl ester of 3-acetoxy-16,17-carboxymethylene-Δ⁵-pregnen-20-one*

40 parts of the ethyl ester of 3-acetoxy-16,17-[3',1'-(3'-carboxy-2'-pyrazolino)] - Δ⁵-pregnen - 20 - one are mixed with boiling stones and heated under nitrogen for 10 minutes at 230–240° C. After cessation of the evolution of nitrogen, the product is cooled and taken up in 2800 parts of ether. The resulting solution is concentrated to one-half of its original volume and chilled to yield the ethyl ester of 3-acetoxy - 16,17 - carboxymethylene-Δ⁵-pregnen-20-one in the form of long, flat needles. Upon recrystallization from ether, needles are obtained melting at 225.5–226.5° C. This product presumably consists of the 16aβ-isomer. A dioxane solution shows a specific rotation $[\alpha]_D = -34°$.

The etheric mother liquors are concentrated and a benzene solution of the residue is applied to a silica gel chromatography column. Elution with a 5% solution of ethyl acetate in benzene yields first an additional quantity of material melting at about 225.3–226.5° C. and then a substance which, recrystallized from ethyl acetate, melts at about 201–203° C., consisting presumably of the 16aα-isomer of the ethyl ester of 3-acetoxy-16,17-carboxymethylene-Δ⁵-pregnen-20-one. The specific optical rotation of a dioxane solution of this product is $[\alpha]_D = -17°$. The ethyl ester of 3-acetoxy-16,17-carboxymethylene-Δ⁵-pregnen-20-one has the structural formula

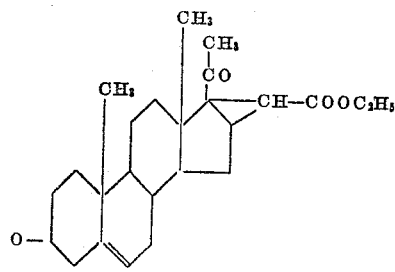

EXAMPLE 3

*16,17-carboxymethylene-Δ⁵-pregnen-3-ol-20-one*

A solution of 4 parts of the ethyl ester of 3-acetoxy-16,17-carboxymethylene-Δ⁵-pregnen-20-one in 360 parts of methanol is treated with a solution of 20 parts of potassium hydroxide in 50 parts of water and 40 parts of methanol. After standing for 12 hours the mixture is treated with 2000 parts of water and then with a sufficient amount of dilute hydrochloric acid to lower the pH to 4. The reaction mixture is extracted with ether and the ether extract is dried over anhydrous sodium sulfate, filtered and evaporated to yield the 16,17-carboxymethylene-Δ⁵-pregnen-3-ol-20-one, which is crystallized from methanol and then from ethyl acetate. The very fine needles melt at about 297–302° C. The compound has the structural formula

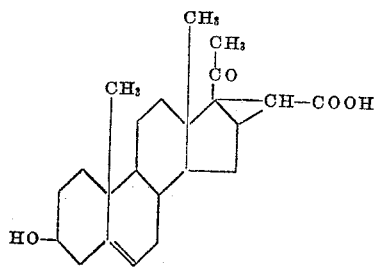

EXAMPLE 4

*Methyl ester of 16,17-carboxymethylene-Δ⁵-pregnen-3-ol-20-one*

A mixture of 30 parts of Δ⁵,¹⁶-pregnadien-3-ol-20-one and 21 parts of methyl diazoacetate is heated under reflux at 120–140° C. for an hour. Upon cooling the methyl ester of 16,17-[3',1'-(3'-carboxy-2'-pyrazolino)]-Δ⁵-pregnen-3-ol-20-one is obtained. 10 parts of this compound are mixed with boiling stones and heated for 15 minutes at about 225° C. under nitrogen. When the nitrogen development ceases, the product is cooled and dissolved in ether. The solution is washed with water, dried over sodium sulfate, filtered and concentrated to yield the methyl ester of 16,17-carboxymethylene-Δ⁵-pregnen-3-ol-20-one, which melts at about 235–236° C. This compound has the structural formula

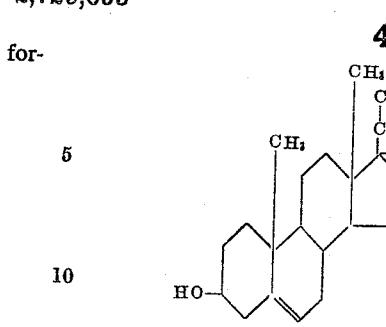

EXAMPLE 5

*Methyl ester of 16,17-carboxymethylene-Δ⁵-pregnen-3-ol-20-one*

A solution of 3 parts of 16,17-carboxymethylene-Δ⁵-pregnen-3-ol-20-one in 7000 parts of ether is treated with an etheric solution of diazomethane prepared from 4 parts of nitrosomethylurea. Excess acetic acid is added and the ether solution is washed with water, saturated sodium bicarbonate, water and sodium chloride, dried over sodium sulfate and concentrated in vacuo until crystallization occurs. The precipitate is collected on a filter and washed with ether. The elongate crystals melt at 235.8–237.2° C.

EXAMPLE 6

*Butyl ester of 3 - butyroxy - 16,17 - carboxymethylene-Δ⁵-pregnen-20-one*

A solution of 1 part of 16,17-carboxymethylene-Δ⁵-pregnen-3-ol-20-one in 200 parts of n-butanol is treated with 3.4 parts of acetyl chloride. After standing for a day the mixture is evaporated under vacuum and the residue is dissolved in a mixture of 50 parts of pyridine and 78 parts of butyric anhydride. After standing for a day the mixture is decomposed in ice and water and extracted with ether. The extract is washed with water and aqueous sodium chloride solution, dried over sodium sulfate, filtered and evaporated to yield the butyl ester of 3-butyroxy - 16,17 - carboxymethylene - Δ⁵-pregnen-20-one. The infrared absorption spectrum shows maxima at 5.82, 5.91, 7.98, and 9.67 microns. The compound has the structural formula

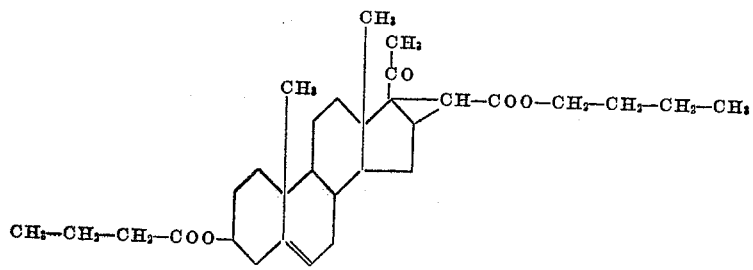

EXAMPLE 7

*Ethyl ester of 16,17-carboxymethylene-Δ⁵-pregnen-3-ol-20-one*

A mixture of 31.4 parts of Δ⁵,¹⁶-pregnadien-3-ol-20-one and 25 parts of ethyl diazoacetate is heated under reflux at 120–140° C. for one hour. Upon cooling a brown oil is obtained. The ethyl ester of 16,17-[3',1'-(3'-carboxy-2-pyrazolino)]-Δ⁵-pregnen-3-ol-20-one shows ultraviolet absorption maxima at 290 and 317 millimicrons and infrared maxima at 2.92, 6.38 and 8.91 microns. This product is mixed with boiling stones and heated for 20 minutes at about 220° C. under nitrogen and upon cessation of the nitrogen development the product is cooled and dissolved in ether. The ether solution is washed with water, dried over sodium sulfate, filtered and evaporated to yield the ethyl ester of 16,17-carboxy-methylene-Δ⁵-pregnen-3-ol-20-one. The compound shows infrared maxima at 2.87, 5.80, and 5.89 microns. It has the structural formula

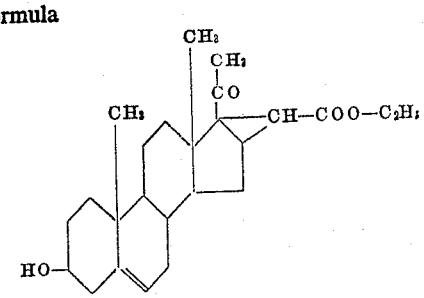

EXAMPLE 8

*3-acetoxy-16,17-carboxymethylene-Δ⁵-pregnen-20-one*

A solution of 2 parts of 16,17-carboxymethylene-Δ⁵-pregnen-3-ol-20-one in 50 parts of warm pyridine is cooled to room temperature and then treated with 50 parts of acetic anhydride and allowed to stand for 12 hours. After hydrolysis in ice and water, the reaction mixture is extracted with ether and the ether extract is washed with water and sodium chloride solution, dried over sodium sulfate and evaporated. The residue is dissolved in benzene and crystallized by addition of petroleum ether to a concentrated benzene solution. The 3-acetoxy-16,17-carboxymethylene-Δ⁵-pregnen-20-one is obtained in fine needles which melt at about 243–245° C. The specific rotation of a dioxane solution is −37.5°. The compound has the structural formula

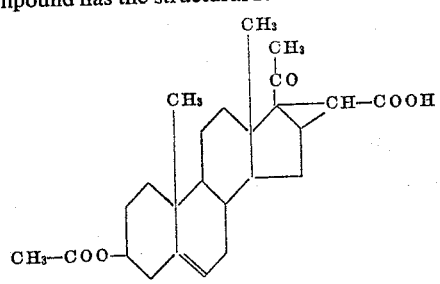

EXAMPLE 9

*δ-Dimethylaminobutyl ester of 3-acetoxy-16,17-carboxymethylene-Δ⁵-pregnen-20-one*

A solution of 25 parts of 3-acetoxy-16,17-carboxymethylene-Δ⁵-pregnen-20-one in 1200 parts of isopropanol is refluxed for 5 hours with 10 parts of δ-chlorobutyldimethylamine. After cooling the reaction mixture is diluted with water, rendered alkaline with aqueous sodium bicarbonate solution and extracted with ether. This extract is dried over calcium sulfate, filtered and evaporated to yield the δ-dimethylaminobutyl ester of 3-acetoxy-16,17-carboxymethylene-Δ⁵-pregnen-20-one which has the structural formula

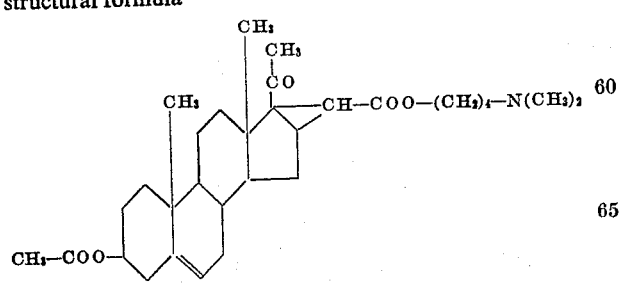

EXAMPLE 10

*β-diethylaminoethyl ester of 16,17-carboxymethylene-3-hydroxy-Δ⁵-pregnen-20-one*

A solution of 6 parts of 16,17-carboxymethylene-Δ⁵-pregnen-3-ol-20-one in 270 parts of isopropanol is refluxed for 4 hours with 2.7 parts of β-chloroethyldiethylamine. The reaction mixture is then cooled, diluted with 3 volumes of water, made alkaline with aqueous sodium bicarbonate solution and extracted with ether. The extract is dried over calcium sulfate, filtered and concentrated to yield the β-diethylaminoethyl ester of 16,17-carboxymethylene-Δ⁵-pregnen-20-one in heavy needles, which melt at about 151–153° C. This compound has the structural formula

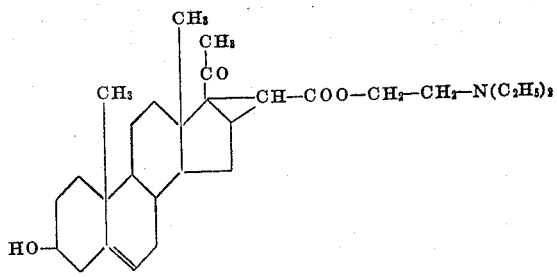

EXAMPLE 11

*Methyl ester of 16,17-carboxymethylene-Δ⁴-pregnene-3,17-dione*

A mixture of 30 parts of 16-dehydroprogesterone and 21 parts of methyl diazoacetate is heated at 125° C. for an hour and the resulting product is taken up in 1400 parts of hot ether. The ether solution is evaporated to yield the methyl ester of 16,17-[3′,1′-(3′-carboxy-2′-pyrazolino)]-4-pregnene-3,17-dione as a yellow oil. This ester is heated under nitrogen.

Heating of 30 parts of 16-dehydroprogesterone and 21 parts of methyl diazoacetate yields the methyl ester of 16,17-[3′,1′-(3′ - carboxy - 2′ - pyrazolino)]-Δ⁴-pregnene-3,17-dione which is isolated in the manner described in the preceding example. This ester is heated under nitrogen for 15 minutes at 225° C. After cessation of the nitrogen development, the product is cooled and dissolved in ether. Concentration yields the methyl ester of 16,17-carboxymethylene-Δ⁴-pregnene-3,17-dione. The same ester is obtained by the following procedure. In a nitrogen atmosphere a solution of 1.9 parts of the methyl ester of 16,17-carboxymethylene-Δ⁴-pregnen-3 - ol - 20 - one in 135 parts of toluene is treated with 3 parts of aluminum isopropoxide in 15 parts of toluene and with 10 parts of cyclohexanone. After refluxing gently for an hour, the mixture is treated with 20 parts of a saturated aqueous Rochelle salt solution and then steam distilled for an hour. The residue is extracted with ether and the extract is washed with water, dried over sodium sulfate, filtered and evaporated to yield the methyl ester of 16,17-carboxymethylene-Δ⁴-pregnene-3,17-dione in crystals melting at 203–204° C. The compound has the structural formula

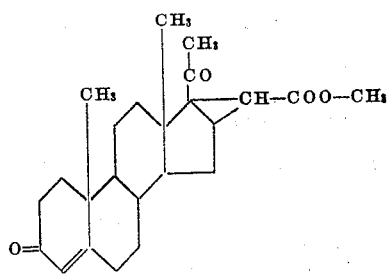

EXAMPLE 12

*16,17-carboxymethylene-Δ⁴-pregnene-3,17-dione*

Under a nitrogen atmosphere 7 parts of the methyl ester of 16,17-carboxymethylene-Δ⁴-pregnene-3,17-dione in 800 parts of hot methanol are treated with 25 parts of potassium hydroxide in 40 parts of water and 40 parts of methanol and the mixture is refluxed for 30 minutes. Then 1250 parts of warm water and 40 parts of dilute hydrochloric acid are added and the methanol is removed by vacuum distillation. After cooling the flocculent crystals are collected on a filter and recrystallized from methanol diluted with water. The melting point of the product as determined in an evacuated tube is 245–246° C. The specific optical rotation of a chloroform solution is +109°. The ultra-violet absorption spectrum shows a maximum at 240 millimicrons with a molecular extinction coefficient of 14,820. The infrared spectrum as determined in potassium bromide shows maxima at 5.75, 5.86, and 6.03 microns. This compound has the structural formula

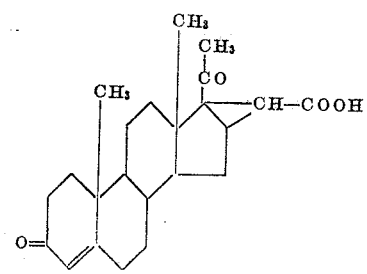

EXAMPLE 13

β-dimethylaminoethyl ester of 16,17-carboxymethylene-Δ⁴-pregnene-3,17-dione

A solution of 10 parts of 16,17-carboxymethylene-Δ⁴-pregnene-3,17-dione in 500 parts of isopropanol is refluxed for 5 hours with 22 parts of β-chloroethyldimethylamine. The reaction mixture is then chilled, diluted with water, rendered alkaline with aqueous potassium carbonate solution, and extracted with ether. This extract is dried over sodium sulfate, filtered and concentrated to yield the β-dimethylaminoethyl ester of 16,17-carboxymethylene-Δ⁴-pregnene-3,17-dione in needle shaped crystals. The compound has the structural formula

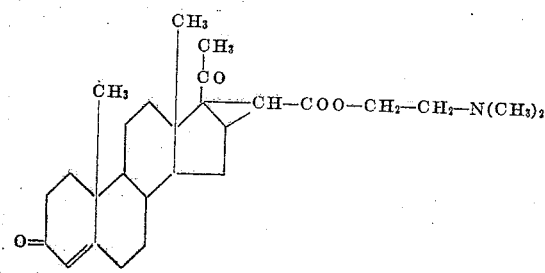

I claim:
1. A pregnene of the structural formula

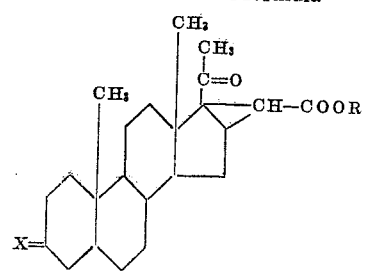

wherein the carbon atom in position 5 is joined to one of the carbon atoms in position 4 and 6 by a double bond and to the other by a single bond, wherein X= is a member of the class consisting of

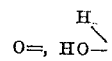

and

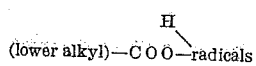

and wherein R is a member of the class consisting of hydrogen, lower alkyl radicals and radicals of the structural formula (lower alkylene)-N-(lower alkyl)₂.

2. A compound of the structural formula

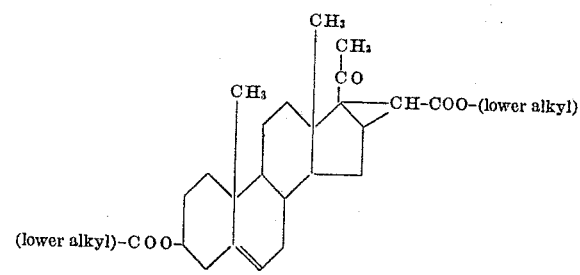

3. A compound of the structural formula

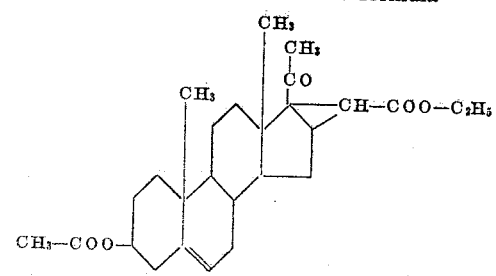

4. A compound of the structural formula

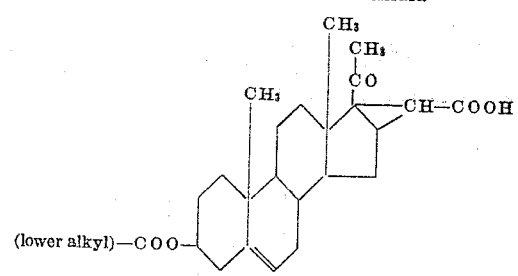

5. A compound of the structural formula

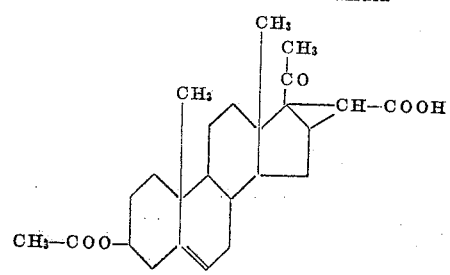

6. A compound of the structural formula

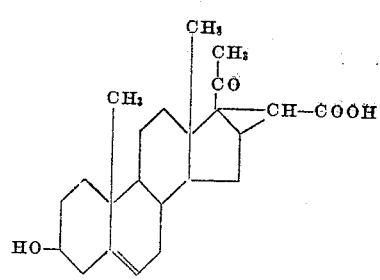

7. A compound of the structural formula

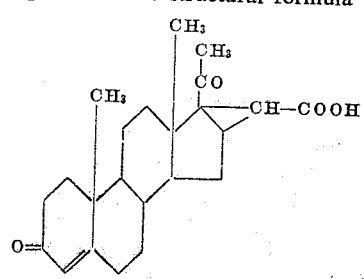

8. A compound of the structural formula
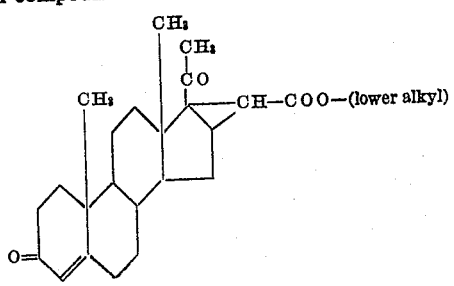
9. A compound of the structural formula
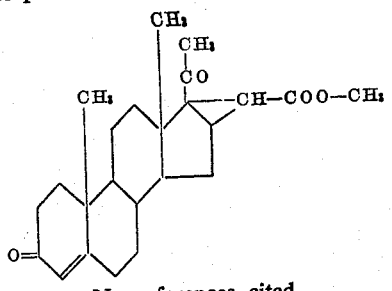
No references cited.